United States Patent [19]
Miller, III

[11] 3,853,769
[45] Dec. 10, 1974

[54] RIGID CASING FOR DIALYZER COIL
[75] Inventor: Frederick W. Miller, III, Glenmore, Pa.
[73] Assignee: Extracorporeal Medical Specialties, Inc., King of Prussia, Pa.
[22] Filed: Apr. 5, 1973
[21] Appl. No.: 348,010

[52] U.S. Cl. ............................. 210/321, 210/494
[51] Int. Cl. ........................................... B01d 31/00
[58] Field of Search ............ 210/232, 321, 446, 494

[56] References Cited
UNITED STATES PATENTS

| | | | |
|---|---|---|---|
| 3,002,870 | 10/1961 | Belgarde et al. | 210/446 X |
| 3,173,867 | 3/1965 | Michaels | 210/494 X |
| 3,442,388 | 5/1969 | Pall | 210/321 |
| 3,464,562 | 9/1969 | Meyers et al. | 210/321 |
| 3,701,433 | 10/1972 | Krakauer et al. | 210/446 X |
| 3,712,474 | 1/1973 | Martinez | 210/494 X |
| 3,743,098 | 7/1973 | Martinez | 210/494 X |

Primary Examiner—Frank A. Spear, Jr.
Attorney, Agent, or Firm—Connolly and Hutz

[57] ABSTRACT

A rigid, clear, transparent styrene casing for a dialyzer coil of the type useful in artificial kidney machines wherein the casing consists of an upper end cap and a lower end cap, each being generally cup-shaped and proportioned for mating engagement with each other at their rim portions and tapering slightly inwardly from their rim portions to their base portions. There is also provided an optional cylindrical extension member which may be positioned between the upper and lower end caps to provide an elongated casing for an elongated dialyzer coil. In either arrangement, the base portion of the lower end cap has an outwardly extending central flange adapted for engagement with a dialysis inflow opening of an artificial kidney machine, and the base portion of the upper end cap has a large central aperture and a plurality of smaller dialysis outflow apertures spaced in a circle around the large central aperture.

1 Claim, 4 Drawing Figures

PATENTED DEC 10 1974 3,853,769
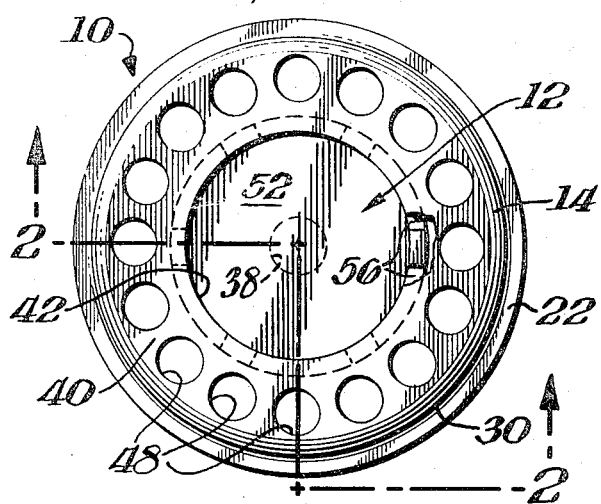
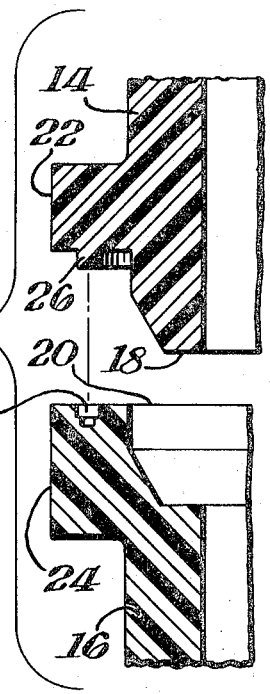
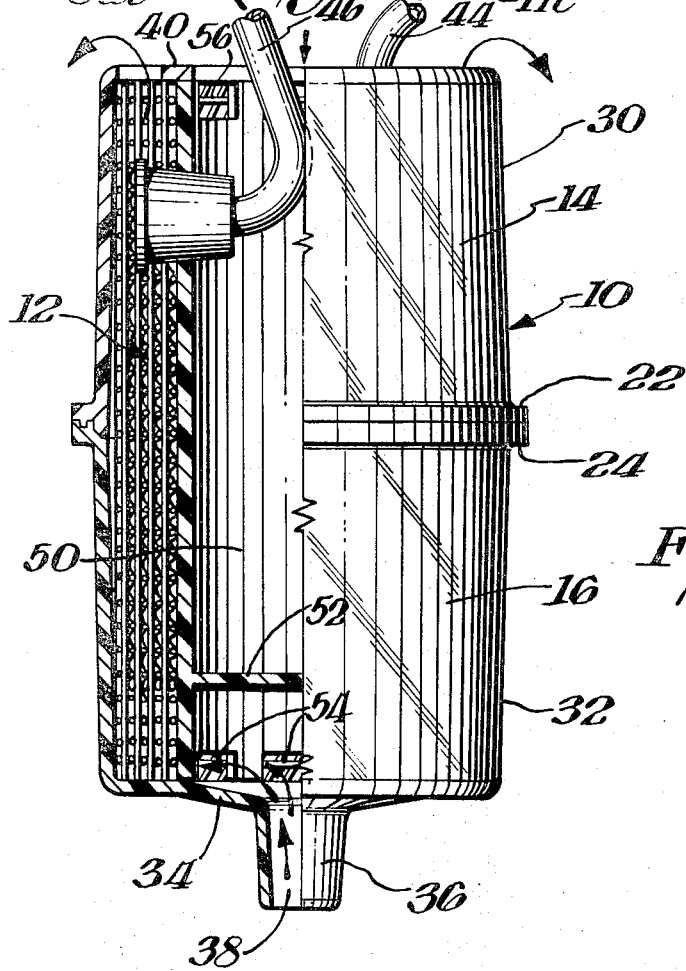
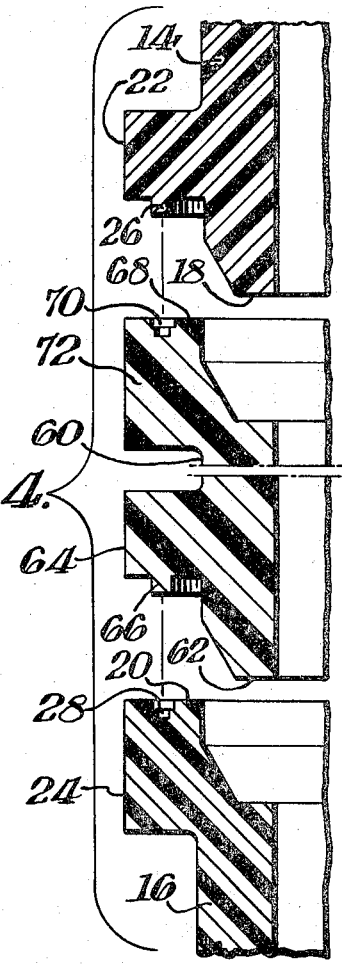

RIGID CASING FOR DIALYZER COIL

BACKGROUND OF THE INVENTION

This invention relates to the field of artificial kidney systems for treating human blood, to properly balance its various components as in acute or chronic renal failure, the removal or exogenous or endogenous poisons, or the like.

Prior to the present invention artificial kidney systems of the type which includes a dialyzer coil have met with a large measure of commercial success. One such dialyzer coil is the subject matter of U.S. Pat. No. 3,508,662 (April, 1970). The dialyzer coil of the aforesaid patent has a flexible outer housing member of plastic material having elastic or heat shrinkable qualities so that it snugly envelopes the cylindrical portions of the coil unit, and secures the upper and lower end caps in place.

There are certain disadvantages, however, connected with the use of flexible casings for dialyzer coils. One such problem is that the dialyzer coil is not adequately protected against inadvertant puncturing which creates intolerable leakage situations. Another disadvantage is that mechanical hold down clamps are required to properly position a dialyzer coil having a flexible casing in conventional artificial kidney machines. Flexible casings, moreover, are less than 100 percent efficient in maintaining the requisite resistance to bulging of the dialyzer coil during operation.

Thus, the problem heretofore unsolved by the prior art is the provision of a rigid casing for dialyzer coils which is simple in structure, utilizing as few parts as possible, for economical assembly and superior operational purposes.

SUMMARY OF THE INVENTION

This invention provides a simple, rugged and inexpensive rigid casing for dialyzer coils which obviates the necessity of special hold down clamps, prevents puncturing and protects the dialyzer coil, and properly controls the dimensional features of the dialyzer coil during operation. The casing comprises an upper end cap and a lower end cap, each end cap being generally cup-shaped and proportioned for mating engagement with each other at their rim portions and tapering slightly inwardly from their rim portions to the end base portions, the base portion of the lower end cap having an outwardly extending central flange adapted for engagement with a dialysis inflow opening of an artificial kidney machine, the base portion of the upper end cap having a large central aperture and a plurality of smaller dialysis outflow apertures spaced in a circle around the large central aperture.

BRIEF DESCRIPTION OF THE DRAWINGS

Numerous advantages of the present invention will become apparent to one skilled in the art from a reading of the detailed description in conjunction with the accompanying drawings wherein similar reference characters refer to similar parts, and in which:

FIG. 1 is a plan view, with parts broken away, illustrating the rigid casing of the present invention;

FIG. 2 is a partial sectional elevational view on line 2—2 of FIG. 1;

FIG. 3 is a greatly enlarged fragmentary detailed view of the cross-sectional configuration of the outwardly extending flanges around the rim portions of the end caps; and, FIG. 4 is a view similar to FIG. 3 showing the outwardly extending flanges of an optional cylindrical extension member which may be positioned between the upper and lower end caps to provide an elongated casing.

DETAILED DESCRIPTION

Referring in more particularity to the drawings, the rigid casing 10 for a dialyzer coil 12 is illustrated apart from the artificial kidney machine with which it is used. The rigid casing comprises an upper end cap 14 and a lower end cap 16, each end cap being generally cup-shaped.

The rim portion 18 of the upper end cap and the rim portion 20 of the lower end cap are proportioned for mating engagement with each other. The rim portion 18 of the upper end cap includes an outwardly extending flange 22 therearound, and the rim portion 20 of the lower end cap also includes an outwardly extending flange 24 therearound. The flanges 22, 24 provide added strength to resist distortion from laterally applied forces. The flanges include mating configurations such as an annular ridge 26 on the flange 22 and an annular groove 28 on the flange 24 for effectuating a seal to join the end caps together at their rim portions.

Both the upper end cap 14 and the lower end cap 16 have sidewall portions 30 and 32, respectively, which taper slightly inwardly from their rim portions to their base portions. The sidewalls 30 and 32 are actually conical, although the taper is so slight as to give the appearance of generally cylindrical walls.

The base portion 34 of the lower end cap 16 is solid and fluid-tight, but it has an outwardly extending central flange 36 with an opening 38 therethrough. The flange 36 is tapered and adapted for engagement with a dialysis inflow opening of an artificial kidney machine without the use of O-rings or other means to effectuate fluid-tight seals.

The base portion 40 of the upper end cap 14 has a large central aperture 42 to permit outflow of dialyzing fluid and to provide access for blood inlet tubing 44 and blood outlet tubing 46. The base portion 40 also has a plurality of smaller dialysis outflow apertures 48 spaced in a circle around the large central aperture 42.

The end caps 14 and 16 which comprise the rigid casing 10 of this invention may be made of any suitable material which has the requisite strength characteristics and which may be sterilized. In the preferred embodiment, the end caps are made of clear, transparent styrene, which permits a view of the dialyzer coil contained within the rigid casing. The end caps may be sealed together at their rim portions by any suitable means, depending upon the material from which they are made. If they are made of plastic material, then the seal may be effected by heat, solvent, mechanical fit, or well-known means. In the preferred embodiment, the configurations 26 and 28 are particularly adapted for sealing together by means of ultrasonic welding techniques.

The above-described rigid casing is useful in combination with a dialyzer coil 12, which includes a cylindrical inner core member 50. The inner core member includes a lateral baffle 52 for the purpose of preventing dialyzing fluid from flowing through the central core and forcing the fluid to flow outside the inner core after the well-known fashion. The diameter of the core member 50 corresponds with the diameter of the large central aperture 42 of the upper end cap. The length of the inner core member is slightly less than the distance between the inside of the base portions 34, 40 of the end caps, such that the inner core member does not interfere with the operation which seals the rim portions of the end caps together. The inner core member 50 has dialysis inflow castellations 54 around its lower end below the baffle wall 52 to permit dialyzing fluid to flow from the lower inlet 38 to the dialyzer coil itself. The inner core member also has dialysis outflow castellations 56 around its upper end to permit dialyzing fluid to flow out of the dialyzer coil through the large central aperture 42, as well as through the small outflow apertures 48.

As an optional feature of the present invention, there is provided a cylindrical extension member 60 which may be positioned between the upper and lower end caps to provide an elongated rigid casing for an elongated dialyzer coil. The extension member 60 includes a lower rim portion 62 having a flange 64 with an annular ridge 66 for sealing engagement with the annular groove 28 of the flange 24 of the lower end cap 16. The extension member 60 also has an upper rim 68 with an annular groove 70 in the flange 72 for mating sealing engagement with the annular ridge 26 of the flange 22 of the upper end cap 14. The inner diameter of the cylindrical extension member 60 corresponds with the inner diameters of the end caps near their rim portions. The length of the cylindrical extension member 60 may be varied within wide ranges to accommodate various lengths of dialyzer coils.

While the above described embodiments constitute the presently preferred modes of practicing this invention, other embodiments and equivalents are included within the scope of the actual invention, which is claimed as:

1. A dialyzer of the type useful in artificial kidney machines comprising a generally cylindrical inner core member, a dialyzer coil positioned therearound, and a rigid outer casing enclosing the dialyzer coil, the inner core member including dialysis inflow castellations around its lower end and dialysis outflow castellations around its upper end, and a lateral baffle wall to prevent dialysing fluid from flowing through the core and direct the fluid to flow through the inflow castellations to the dialyzer coil, the rigid casing consisting essentially of two pieces including an upper end cap and a lower end cap, each end cap being generally cup-shaped and proportioned for mating engagement with each other at their rim portions and sealed together therearound, the conical sidewall portion of each end cap tapering inwardly from its rim portion to its base portion at an angle so slight as to give the appearance of generally cylindrical walls and to properly control the lateral dimensional features of the dialyzer coil during operation, the base portion of the lower end cap having a downwardly extending central flange adapted for engagement with a dialysis inflow opening of an artificial kidney machine to position the dialyzer thereon and provide for flow of dialyzing fluid into the dialyzer, the base portion of the upper end cap having aperture means to provide for flow of dialyzing fluid out of the dialyzer in cooperation with the outflow castellations around the upper end of the inner core member.

* * * * *